(12) United States Patent
Venkatesh

(10) Patent No.: US 10,530,881 B2
(45) Date of Patent: Jan. 7, 2020

(54) REDIRECTING SCANNERS AND PRINTERS OVER A WAN

(71) Applicant: Wyse Technology L.L.C., Santa Clara, CA (US)

(72) Inventor: Ramanujam Kaniyar Venkatesh, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 246 days.

(21) Appl. No.: 15/433,432

(22) Filed: Feb. 15, 2017

(65) Prior Publication Data

US 2018/0234517 A1 Aug. 16, 2018

(51) Int. Cl.
| | | |
|---|---|---|
| H01L 29/08 | (2006.01) | |
| H01L 29/06 | (2006.01) | |
| H04L 29/08 | (2006.01) | |
| H04L 29/06 | (2006.01) | |

(52) U.S. Cl.
CPC .......... *H04L 67/2814* (2013.01); *H04L 69/22* (2013.01)

(58) Field of Classification Search
CPC ...... H04L 67/2814; H04L 69/22; H04L 49/70
USPC .......................................... 709/229; 358/408
See application file for complete search history.

(56) References Cited

U.S. PATENT DOCUMENTS

| | | | | |
|---|---|---|---|---|
| 8,010,630 B2* | 8/2011 | Barreto | ............. | H04L 29/08846 709/219 |
| 8,467,081 B2* | 6/2013 | Su | ........................ | H04N 1/3255 347/3 |
| 8,972,485 B1* | 3/2015 | French | ................... | G06F 9/5044 709/203 |
| 9,069,570 B2* | 6/2015 | Asai | ....................... | G06F 9/4411 |
| 9,760,524 B2* | 9/2017 | Vajravel | .............. | G06F 13/4282 |
| 9,760,730 B2* | 9/2017 | Vajravel | .............. | G06F 21/6218 |
| 9,892,074 B2* | 2/2018 | Vajravel | ................ | G06F 13/385 |
| 10,067,891 B2* | 9/2018 | Venkatesh | ............... | G06F 13/20 |
| 10,223,145 B1* | 3/2019 | Neogy | .................... | H04L 67/24 |
| 2005/0125576 A1* | 6/2005 | Yashiki | ............. | H04N 1/00204 710/62 |
| 2006/0070090 A1* | 3/2006 | Gulkis | ............... | H04N 1/00236 719/328 |
| 2006/0085516 A1* | 4/2006 | Farr | ........................ | G06Q 10/10 709/217 |
| 2006/0179144 A1* | 8/2006 | Nagase | ................. | G06F 13/387 709/226 |
| 2007/0061477 A1* | 3/2007 | Stoyanov | .............. | G06F 9/4411 709/230 |

(Continued)

*Primary Examiner* — Vivek Srivastava
*Assistant Examiner* — Binod J Kunwar
(74) *Attorney, Agent, or Firm* — Kirton McConkie; Brian Tucker

(57) ABSTRACT

Scanners and printers can be redirected over a WAN in an efficient manner by employing a proxy device. When a client terminal has established a remote display protocol connection with a server over a WAN and attempts to redirect a printer, scanner, or other similar device over the connection, the device can instead be redirected to a proxy device that is on the same LAN as the client terminal. The proxy device can then establish a driver mapping connection with the server for the purpose of sending commands pertaining to the redirected device. In this way, the communications over the WAN will be simpler driver mapping commands rather than numerous USB-based IRPs and will therefore not suffer from the latency of the WAN.

20 Claims, 16 Drawing Sheets

(56) References Cited

U.S. PATENT DOCUMENTS

| | | | |
|---|---|---|---|
| 2008/0037050 A1* | 2/2008 | Sasaki | G06F 13/102 358/1.13 |
| 2011/0102443 A1* | 5/2011 | Dror | G06T 1/20 345/522 |
| 2015/0237097 A1* | 8/2015 | Devireddy | H04L 67/42 709/203 |
| 2017/0061145 A1* | 3/2017 | Vajravel | G06F 21/6218 |
| 2017/0063988 A1* | 3/2017 | Vajravel | H04L 67/1097 |
| 2017/0111227 A1* | 4/2017 | Papageorgiou | H04W 4/70 |
| 2017/0251400 A1* | 8/2017 | Jha | H04W 28/06 |
| 2018/0217948 A1* | 8/2018 | Li | G06F 9/45558 |
| 2018/0239728 A1* | 8/2018 | Emerson | G06F 13/385 |

* cited by examiner

REDIRECTING SCANNERS AND PRINTERS OVER A WAN

CROSS-REFERENCE TO RELATED APPLICATIONS

N/A

BACKGROUND

The present invention is generally directed to optimizing the redirection of scanners and printers over a WAN. Device redirection generally refers to making a device that is connected to a client terminal accessible within a virtual desktop as if the device had been physically connected to the virtual desktop. In other words, when device redirection is implemented, a user can connect a device to his or her client terminal and the device will function as if it had been connected to the server.

FIGS. 1 and 2 and the following description will provide a general overview of how device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote (or VDI) session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client side, the desktop running on server 104 may represent a virtual desktop environment.

FIG. 2 is a block diagram of a local device virtualization system 200 in accordance with some embodiments of the present invention. FIG. 2 depicts a redirection scenario that is performed at the USB device level and is only one example of how redirection may be implemented in the present invention. Other redirection/virtualization techniques, e.g., disk level redirection and driver mapping, may also be implemented and are understood by those of skill in the art.

System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLO-BAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

When certain types of devices are redirected in a WAN environment (i.e., when server 104 and client terminal 102 are connected via a WAN), their performance suffers. Devices such as printers, scanners, webcams, or other devices that transmit image-based information require significant I/O overhead in the form of numerous request and response packets (or IRPs). In addition to the IRPs that contain the actual print or image data, IRPs pertaining to device probe, metadata, and other device details will also be exchanged. Given that IRPs are exchanged in a request and response manner, each additional IRP adds to the amount of time required to complete a task and consumes additional bandwidth. For example, a particular scanner may exchange 5000 IRPs when scanning an image. If the latency of the WAN is 150 ms, it would require approximately 12.5 minutes (5000*150 ms) to scan the image.

Although there are a number of WAN optimization techniques (e.g., Forward Error Correction, Compression, UDP-based transport, etc.), these techniques provide little benefit in these redirection scenarios because of the small size of the IRPs and because of the fact that a single response may be sent for each request. As a result, when a scanner, printer, or other similar device is redirected in a WAN environment, it is not possible to approximate a desktop experience.

BRIEF SUMMARY

The present invention extends to methods, systems, and computer program products for redirecting scanners and printers over a WAN. When a client terminal has established a remote display protocol connection with a server over a WAN and attempts to redirect a printer, scanner, or other similar device over the connection, the device can instead be redirected to a proxy device that is on the same LAN as the client terminal. The proxy device can then establish a driver mapping connection with the server for the purpose of sending commands pertaining to the redirected device. In this way, the communications over the WAN will be simpler driver mapping commands rather than numerous USB-based IRPs and will therefore not suffer from the latency of the WAN.

In one embodiment, the present invention is implemented as a method for virtualizing a device in a WAN environment that includes a client terminal, a server, and a proxy device. A remote display protocol connection is established between a proxy executing on the client terminal and an agent executing on the server. In response to a device being connected to the client terminal, the device is virtualized on the server via the proxy device by performing USB redirection between the proxy and a redirection proxy on the proxy device and by performing driver mapping between the redirection proxy and the agent.

In another embodiment, the present invention is implemented as computer storage media storing computer-executable instructions which implement a proxy that is configured to execute on a client terminal that is connected to a LAN, an agent that is configured to execute on a server that is connected to the client terminal via a WAN, and a redirection proxy that is configured to execute on a proxy device that is also connected to the LAN. The proxy and the agent are configured to establish a remote display protocol connection over the WAN. In response to a device being connected to the client terminal, the proxy and the redirection proxy are configured to implement USB device redirection to redirect the device to the proxy device, and the redirection proxy and the agent are configured to implement driver mapping to virtualize the device on the server.

In another embodiment, the present invention is implemented as a method for redirecting a device. A proxy executing on a client terminal receives one or more IRPs pertaining to a device that is connected to the client terminal. The proxy then routes content of the IRPs to a redirection proxy executing on a proxy device. The redirection proxy passes the content of the IRPs to a device driver on the proxy device. The redirection proxy receives a driver mapping command that was generated by the device driver from the content of the IRPs and routes the driver mapping command to an agent executing on a server.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

The present invention can be implemented as part of a virtual desktop infrastructure (VDI) environment to enhance the performance of a redirected printer, scanner, or other similar device when the client terminal establishes a remote display protocol connection over a WAN. A remote display protocol connection can be established using any remote display protocol including, for example, Microsoft's Remote Desktop Protocol (RDP), Citrix's Independent Computing Architecture (ICA), VMWare's PC-over-IP (PCoIP), Dell's vWorkspace (EOP), etc.

In this specification and the claims, the term "high-latency device" will be used to refer to printers, scanners, webcams, and any other device that may require a large number of IRPs to perform a task. Therefore, high-latency devices are those whose performance suffers greatly when redirected over a WAN and would therefore benefit from the techniques of the present invention.

Figure 1:
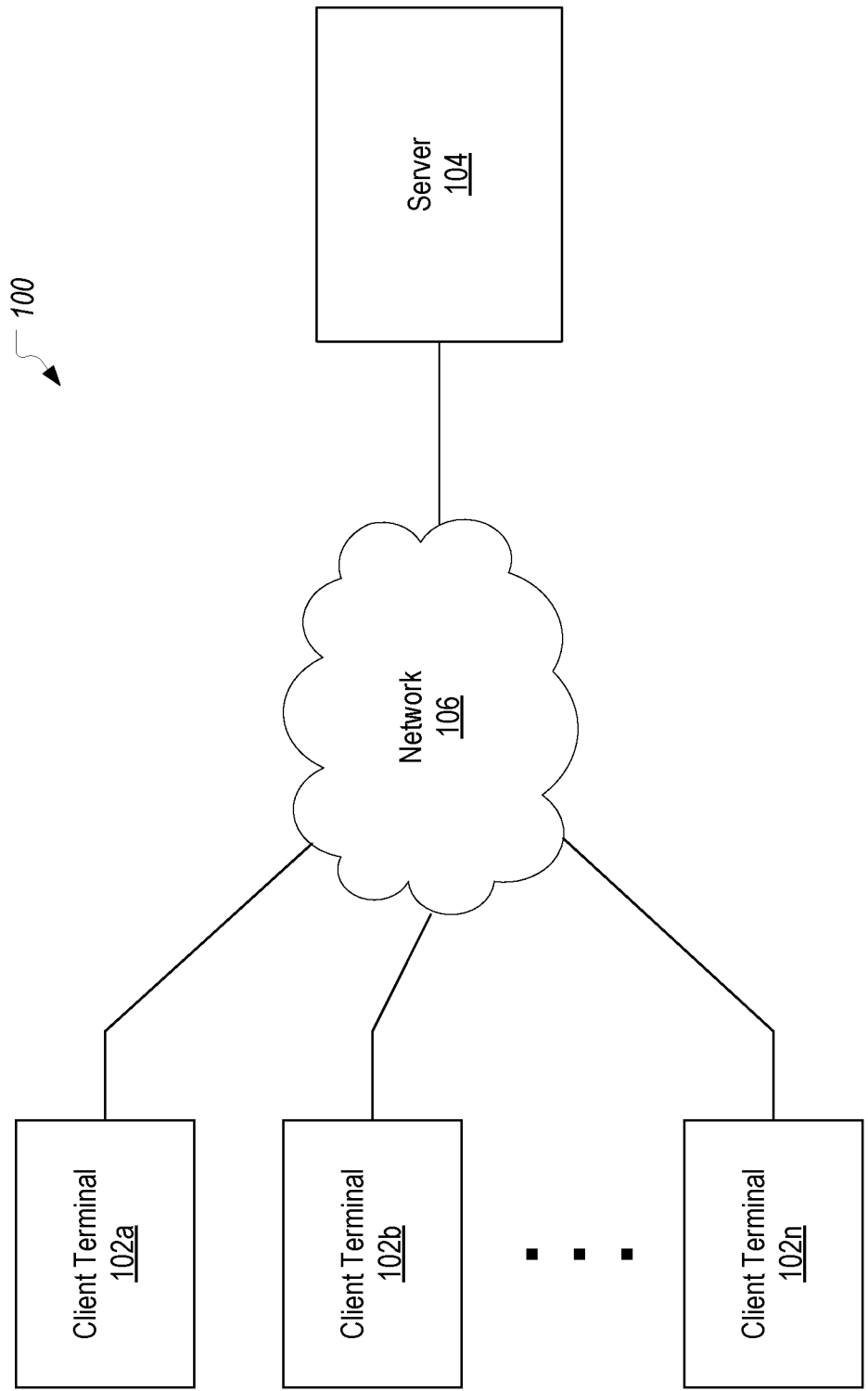
FIG. 1 illustrates an example computing environment in which the present invention can be implemented.
Figure 2:
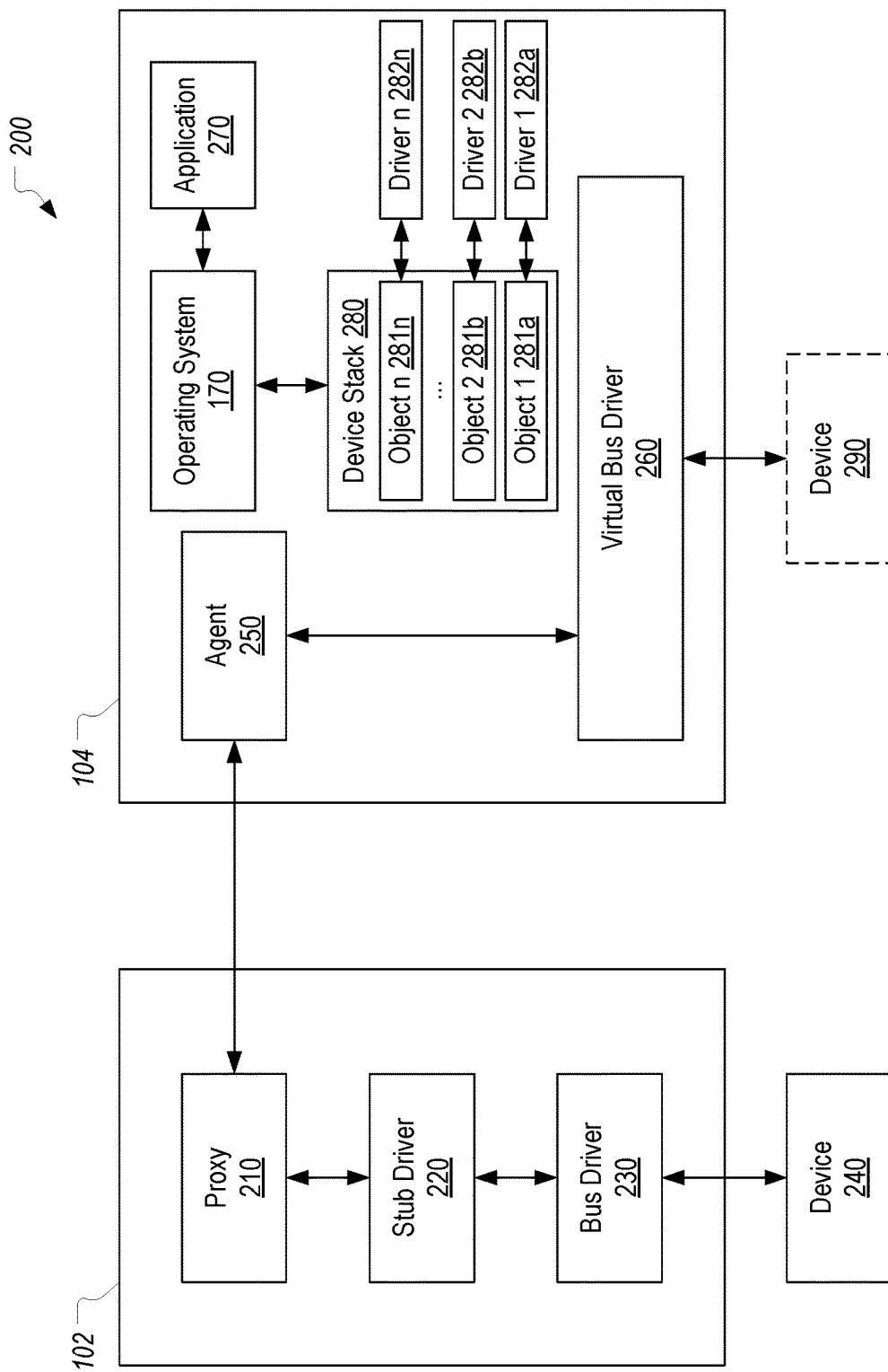
FIG. 2 illustrates how a USB device can be redirected from a client terminal to a server.
Figure 3:
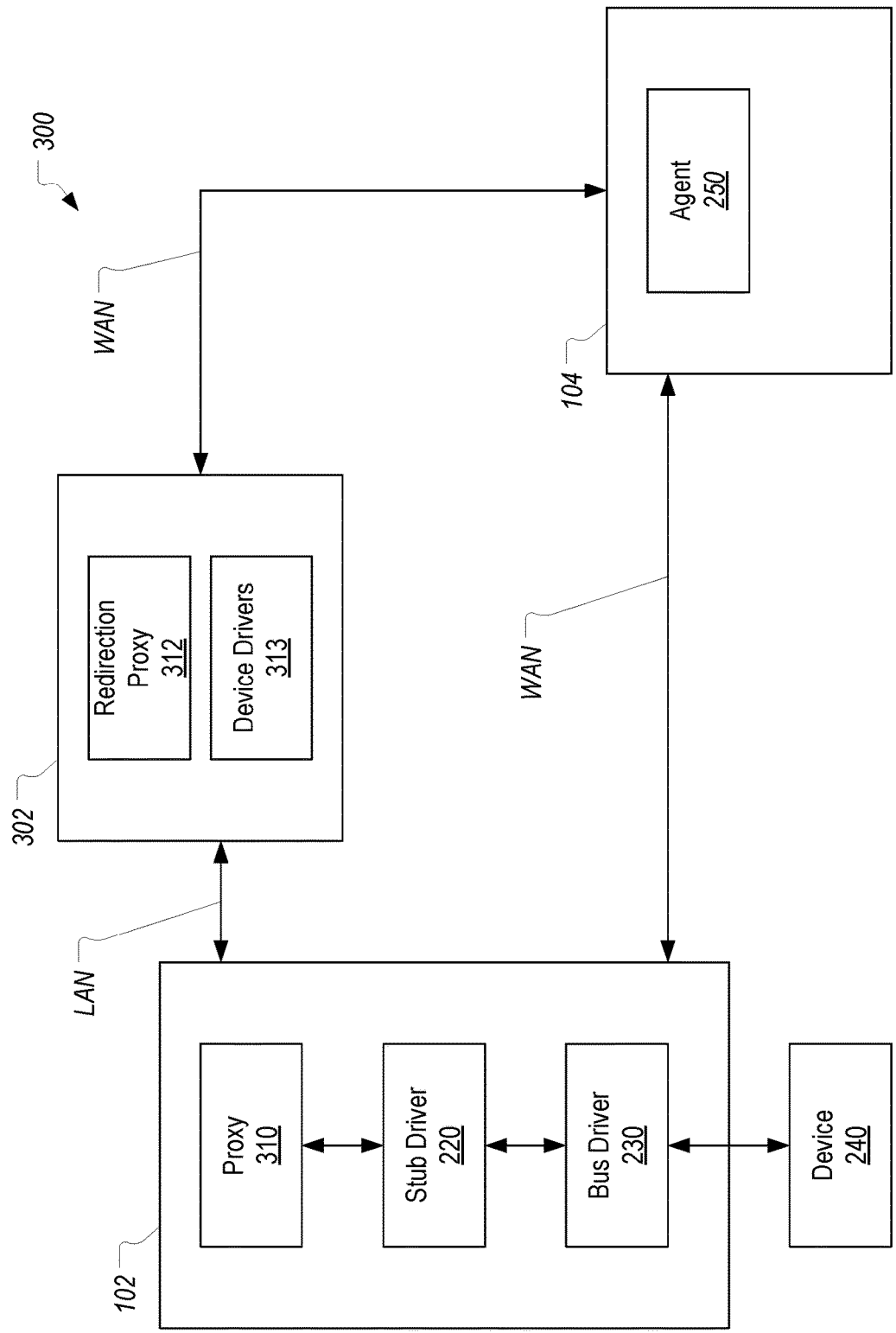
FIG. 3 illustrates an example VDI environment in which the present invention can be implemented.

FIG. 3 illustrates an example of a VDI environment 300 in which the present invention can be implemented. VDI environment 300 includes client terminal 102 (which can represent a large number of client terminals that are similarly configured), server 104, and a proxy device 302. Server 104 can be configured in substantially the same manner as described in the background (e.g., server 104 can be configured to support remote display protocol connections). Therefore, in FIG. 3, server 104 is depicted as only included agent 250.

Client terminal 102 is also configured in a similar manner as described in the background to enable the creation of remote display protocol connections and device redirection techniques. In contrast, however, client terminal 102 in FIG. 3 includes a proxy 310 that is configured to implement the techniques of the present invention.

Proxy device 302 can be any type of computing device that is connected to the same LAN as client terminal 102. For example, proxy device 302 can be a client terminal with the proper drivers (e.g., a client terminal running a Windows operating system), a server, an appliance, etc. Proxy device 302 includes a redirection proxy 312 and device drivers 313. Device drivers 313 can represent the actual device drivers that correspond to high-latency devices that may be connected to client terminal 102 for redirection. For example, device drivers 313 can include a printer driver, a scanner driver, a webcam driver, etc. As indicated in FIG. 3, client terminal 102 and proxy device 302 are situated on the same LAN and connect to server 104 over a WAN.

Figure 4A:
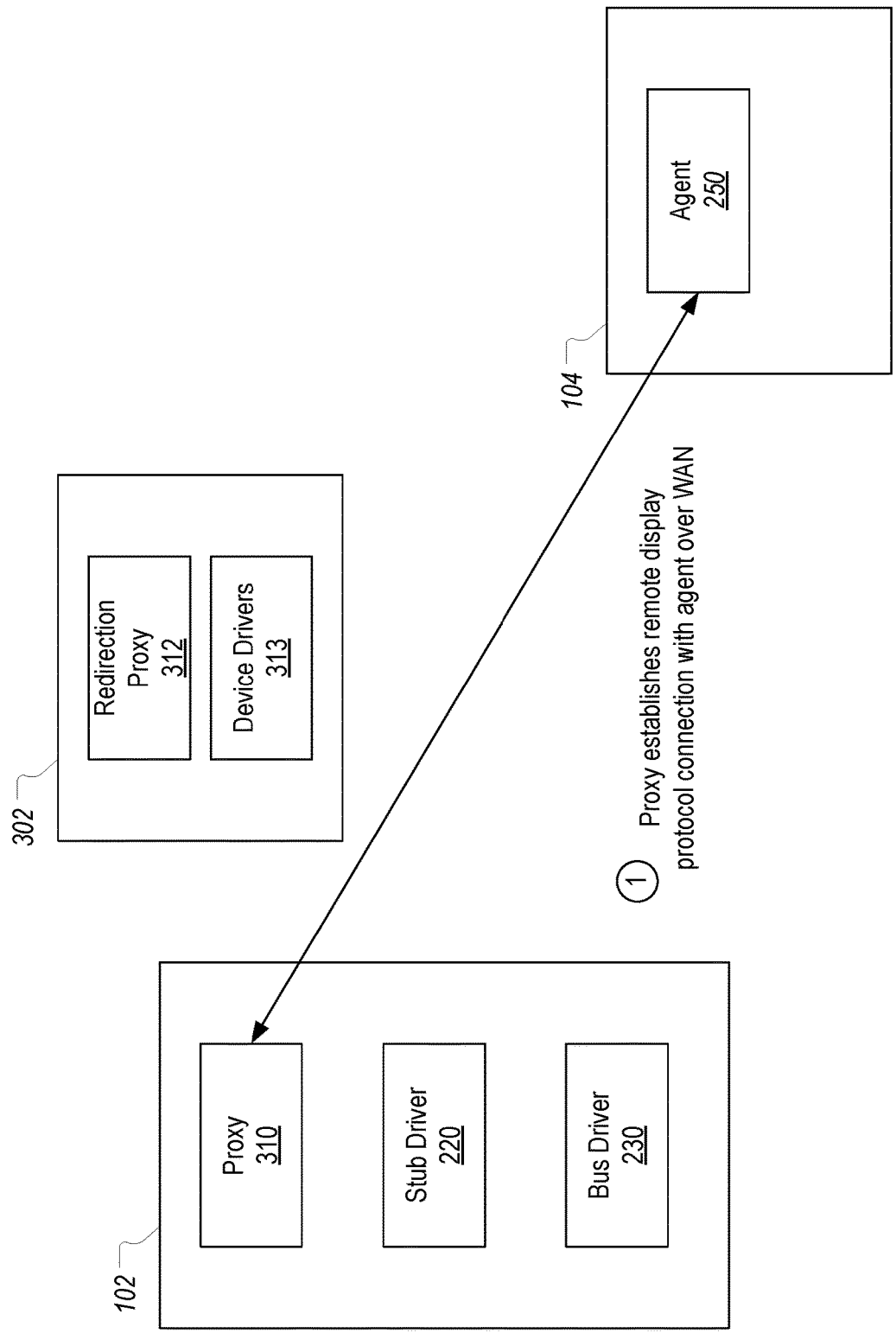
FIGS. 4A-4C provide a general overview of how a device connected to a client terminal can be virtualized on a server by using USB redirection between the client terminal and a proxy device and driver mapping between the proxy device and the server.
Figure 4B:
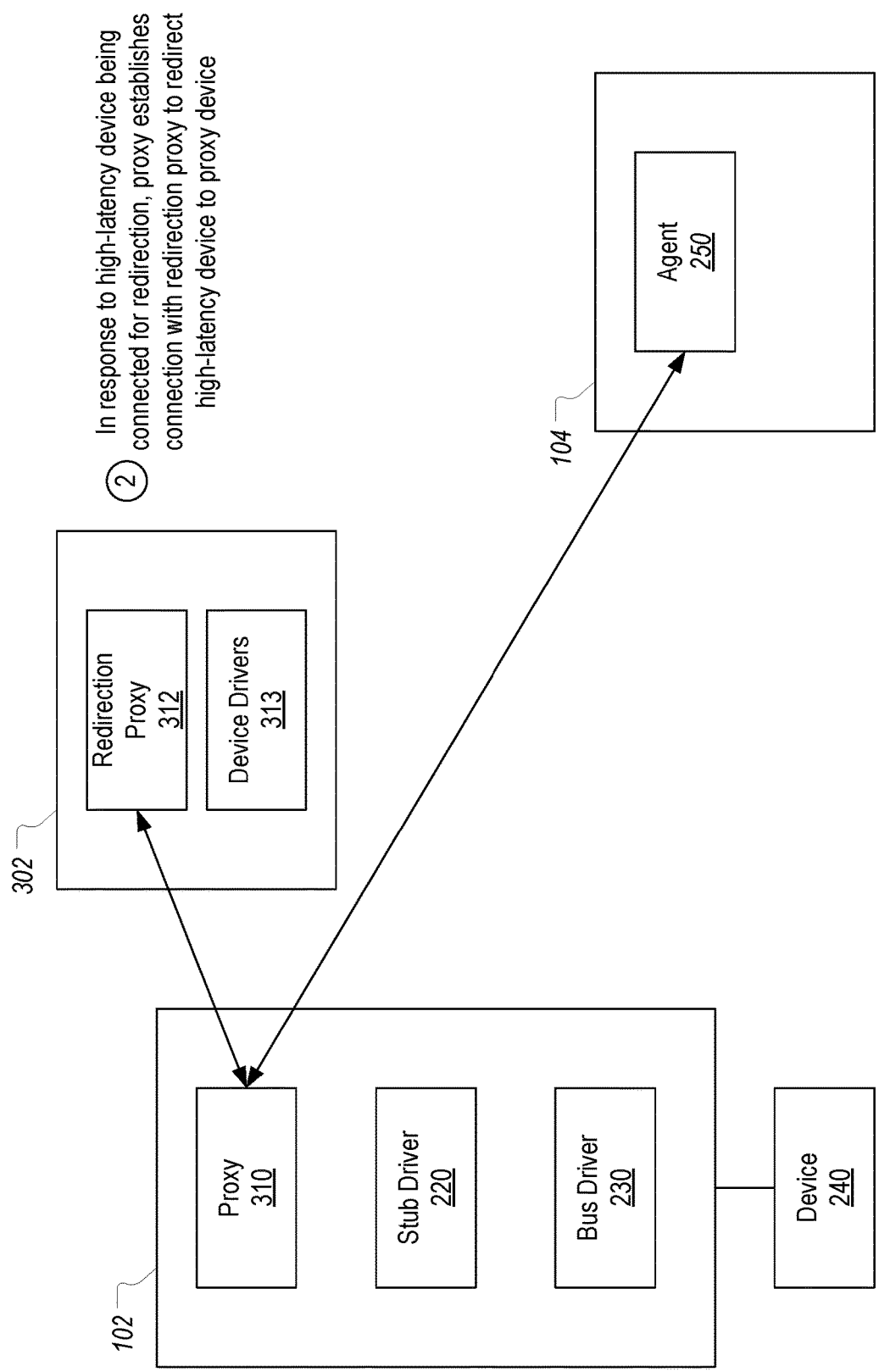
Figure 4C:
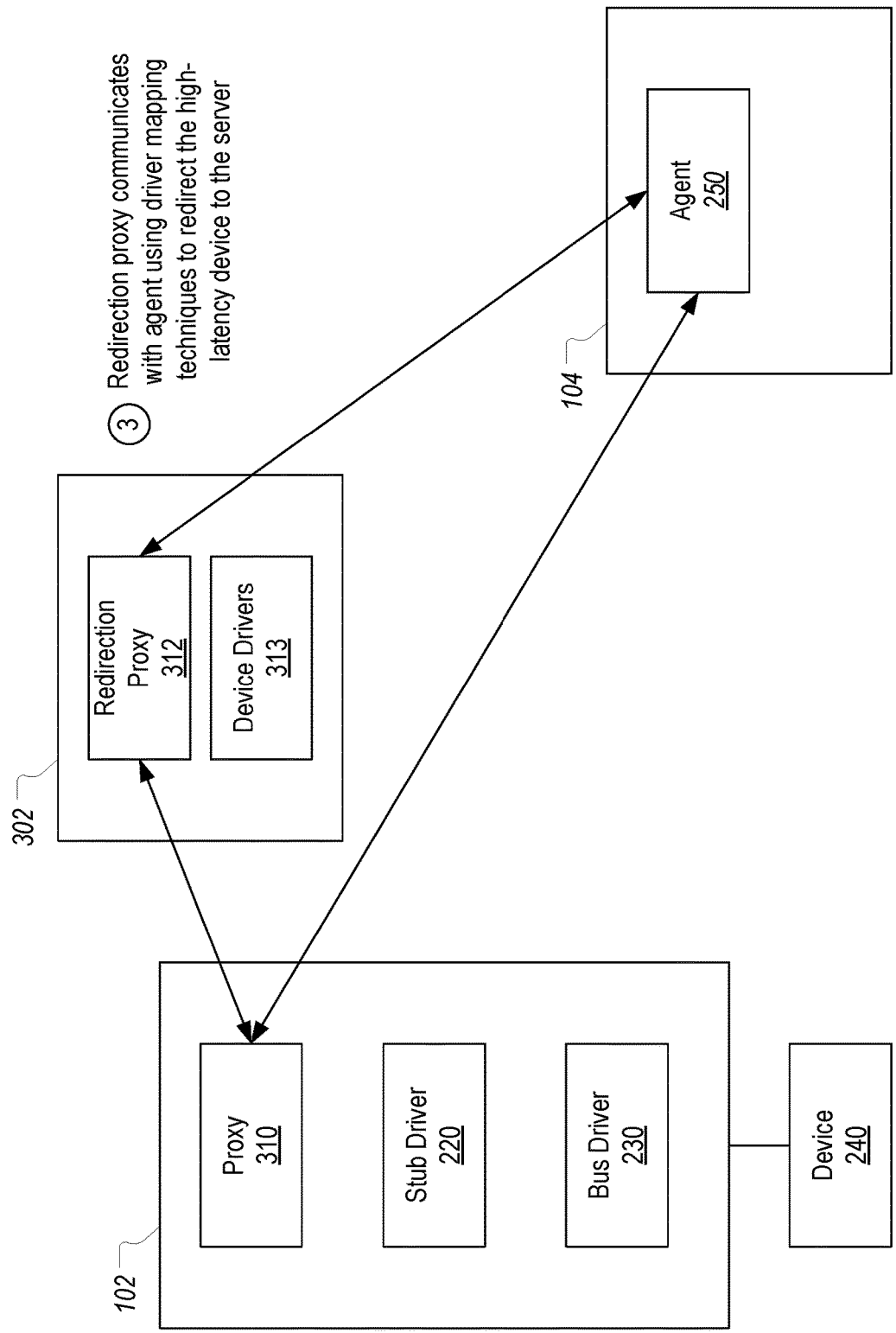

FIGS. 4A-4C provide an overview of how client terminal 102, server 104, and proxy device 302 can function within VDI environment 300 for the purpose of optimizing the redirection of high-latency devices. In FIG. 4A, proxy 310 is shown in step 1 as communicating with agent 250 over the WAN to establish a remote display protocol connection. Step 1 can be performed in a typical manner and will therefore not be further described. However, it is emphasized that the remote display protocol connection will be established over a WAN which, in some embodiments, proxy 310 may be configured to detect. In other words, in some embodiments, when it establishes a remote display protocol connection with a server, proxy 310 may be configured to determine whether client terminal 102 and the server are connected via a LAN or a WAN. In the former case, proxy 310 may be configured to perform device redirection in a typical manner (i.e., without involving proxy device 302), while in the latter case, proxy 310 can perform the techniques of the present invention.

Next, in FIG. 4B, it is assumed that a device 240 has been connected to client terminal 102 and that proxy 310 has identified device 240 as a high-latency device that should be redirected in accordance with the techniques of the present invention. In particular, for some types of devices, typical redirection can be accomplished over the WAN without any significant effect on performance. Therefore, proxy 310 can be configured to identify the type of device that is connected to determine how the device should be redirected. In this example, because device 240 is assumed to be a high-latency device, proxy 310 will employ proxy device 302 to implement the redirection. Accordingly, proxy 310 is shown in step 2 as establishing a connection with redirection proxy 312 on proxy device 302 and using this connection to redirect device 240 to proxy device 302.

It is noted that the connection between proxy 310 and redirection proxy 312 is preferably not a remote display protocol connection. For example, redirection proxy 312 can be configured to receive socket connections from instances of proxy 310 on any reasonable number of client terminals 102 on the LAN. In such cases, proxy 310 can be configured to employ a socket connection to transfer "redirection data" to redirection proxy 312. In this context, redirection data can refer to the communications that proxy 310 would send if device 240 were being redirected directly to server 104. Therefore, redirection data can include the initial device connection notification that includes the device information necessary to virtualize device 240 on server 104 (which is where client terminal 102 will have established a remote session) as well as subsequent communications that pertain to accessing device 240 (e.g., IRPs pertaining to scanning an image or printing).

Finally, in step 3 shown in FIG. 4C, redirection proxy 312 is shown as establishing a connection with agent 250 over the WAN and employing this connection (which may be any suitable type of connection including a socket connection or a remote display protocol connection) to implement driver mapping techniques to redirect device 240 on server 104. Accordingly, redirection proxy 312 functions as an intermediary between proxy 310 and agent 250 to allow USB redirection techniques to be employed over the LAN and driver mapping techniques to be employed over the WAN for purposes of redirecting device 240 to server 104.

Figure 5A:
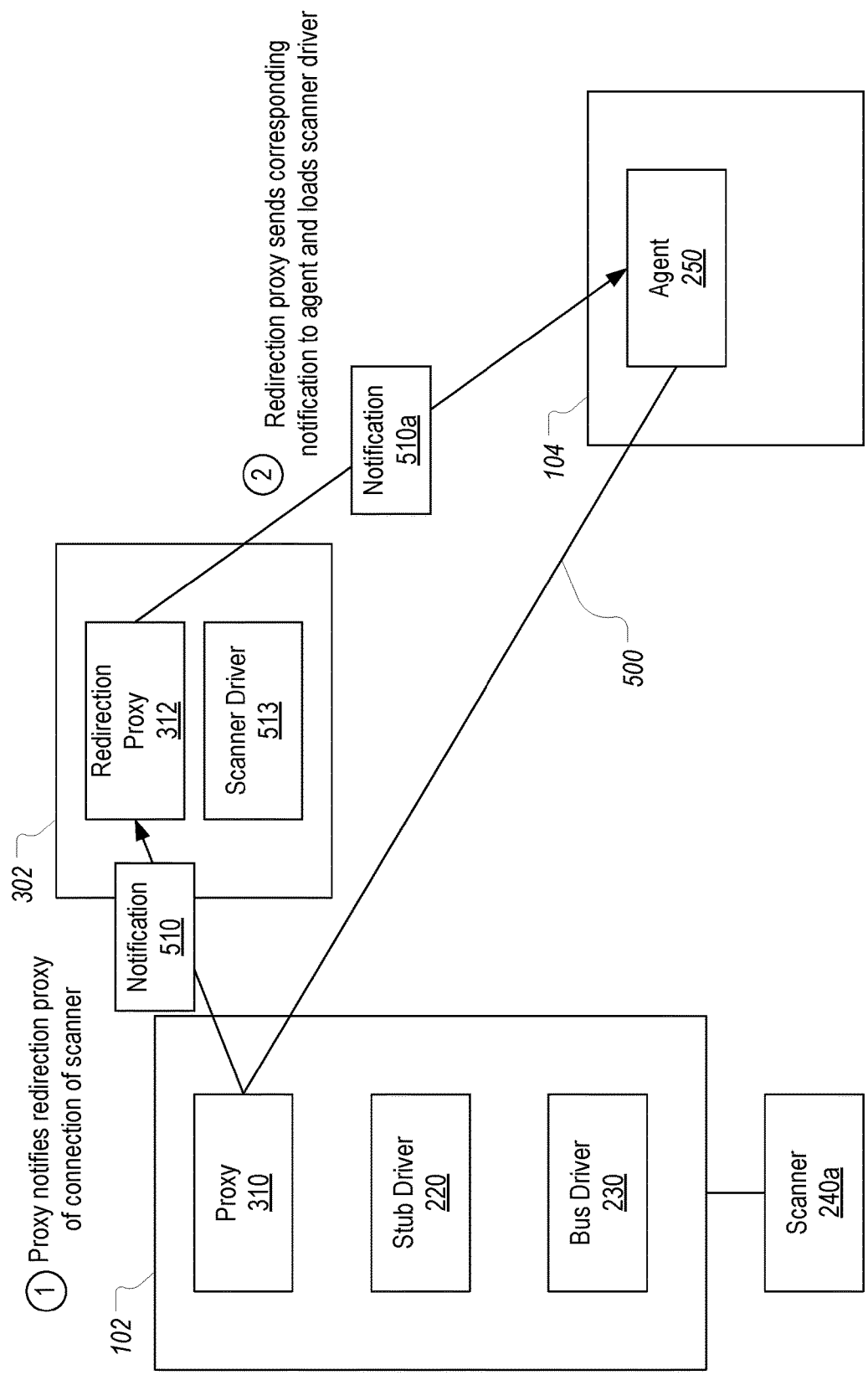
FIGS. 5A-5F illustrate how a scanner can be virtualized on the server.

FIGS. 5A-5F provide a more detailed example of how a scanner can be redirected in accordance with embodiments of the present invention. In FIG. 5A, it will be assumed that proxy 310 has already established a remote display protocol connection 500 with agent 250 and, as a result, a remote session has been established on server 104 for client terminal 102. It will also be assumed that a scanner 240a has been connected to client terminal 102 and that scanner redirection is enabled.

In accordance with embodiments of the present invention, upon detecting the connection of scanner 240a (and possibly upon determining that scanner 240a is a high-latency device), proxy 310 can obtain device information about scanner 240a and include the device information in a notification 510 that is sent to redirection proxy 312 on proxy device 302 in step 1. Notification 510 can include sufficient device information to allow redirection proxy 312 to identify the appropriate device driver (scanner driver 513 which may be identified based on, for example, a USB class/subclass/protocol of scanner 240a or one or more hardware identifiers) to be loaded on proxy device 302 as well as to generate a corresponding notification 510a that is sent to agent 250 in step 2. Notification 510a can include sufficient information to allow agent 250 to load an appropriate virtual driver on server 104.

Figure 5B:
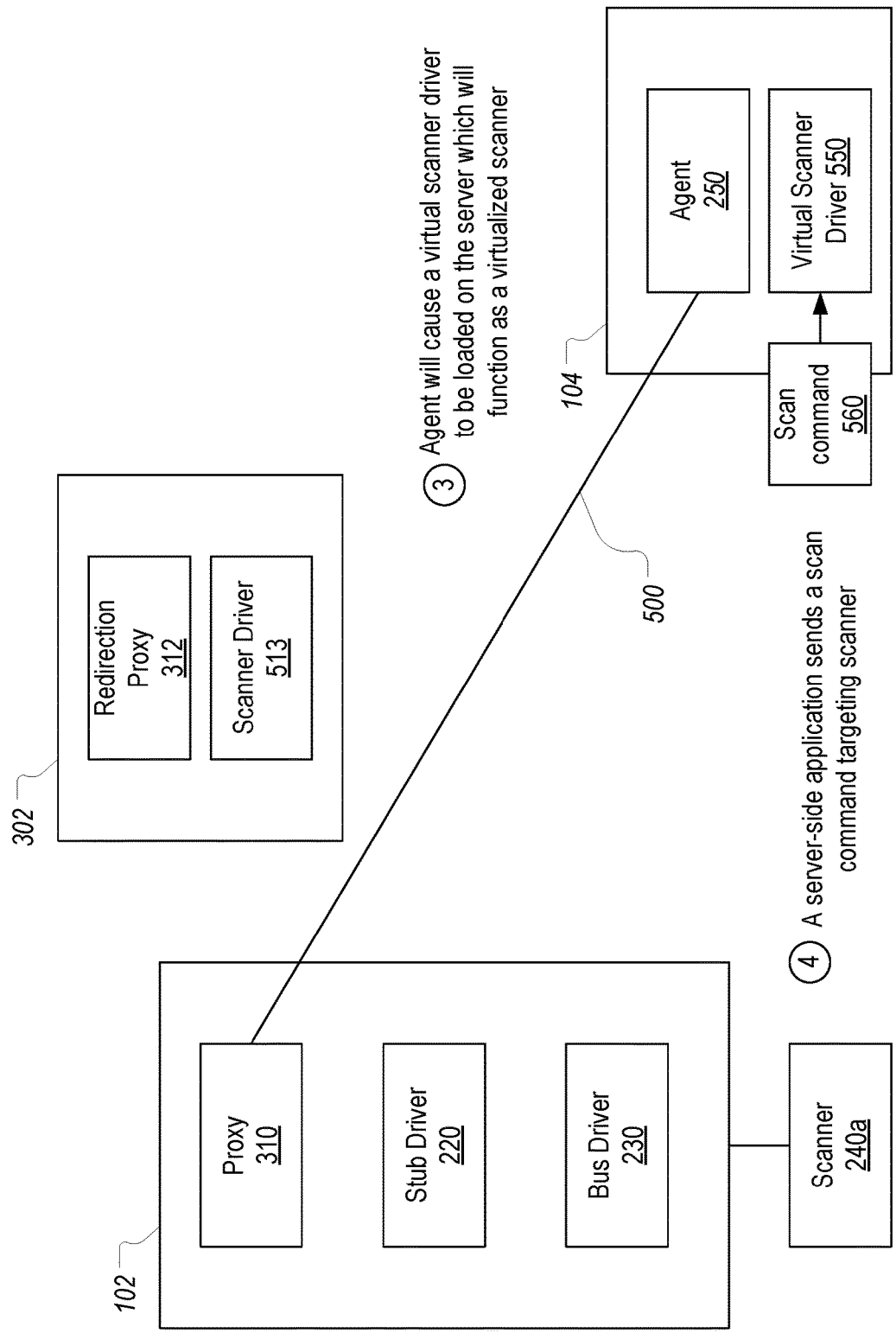

Turning to FIG. 5B, in response to receiving notification 510a, agent 250 can load virtual scanner driver 550 in step 3. Virtual scanner driver 550 can function as a device on server 104 (at least from the perspective of scanner-enabled applications on server 104). For example, virtual scanner driver 550 can be a virtual TWAIN driver that implements a TWAIN interface that applications can employ to communicate with a scanner. Alternatively, a virtual driver that implements WIA commands, ISIS commands, or other similar commands could be employed based on the type of device that is redirected. As is known, these types of commands are higher level commands that provide a common interface for communicating with certain types of devices such as scanners and printers. Of importance to the present invention is the fact that virtual scanner driver 550 (or another type of virtual driver when other types of devices are redirected) will cause scanner 240a to be virtualized on server 104 (i.e., to be accessible to applications executing within the remote session that client terminal 102 has established).

As a result, in step 4, a server-side application (which may or may not be executing within the same remote session that was established via remote display protocol connection 500) is shown as submitting a scan command 560 to virtual scanner driver 550. Scan command 560 can represent any of the many different types of commands (or operations) that are available in TWAIN or equally in WIA, ISIS, or other suitable interface. For purposes of this example, it will be assumed that scan command 560 represents a request to scan an image.

Figure 5C:
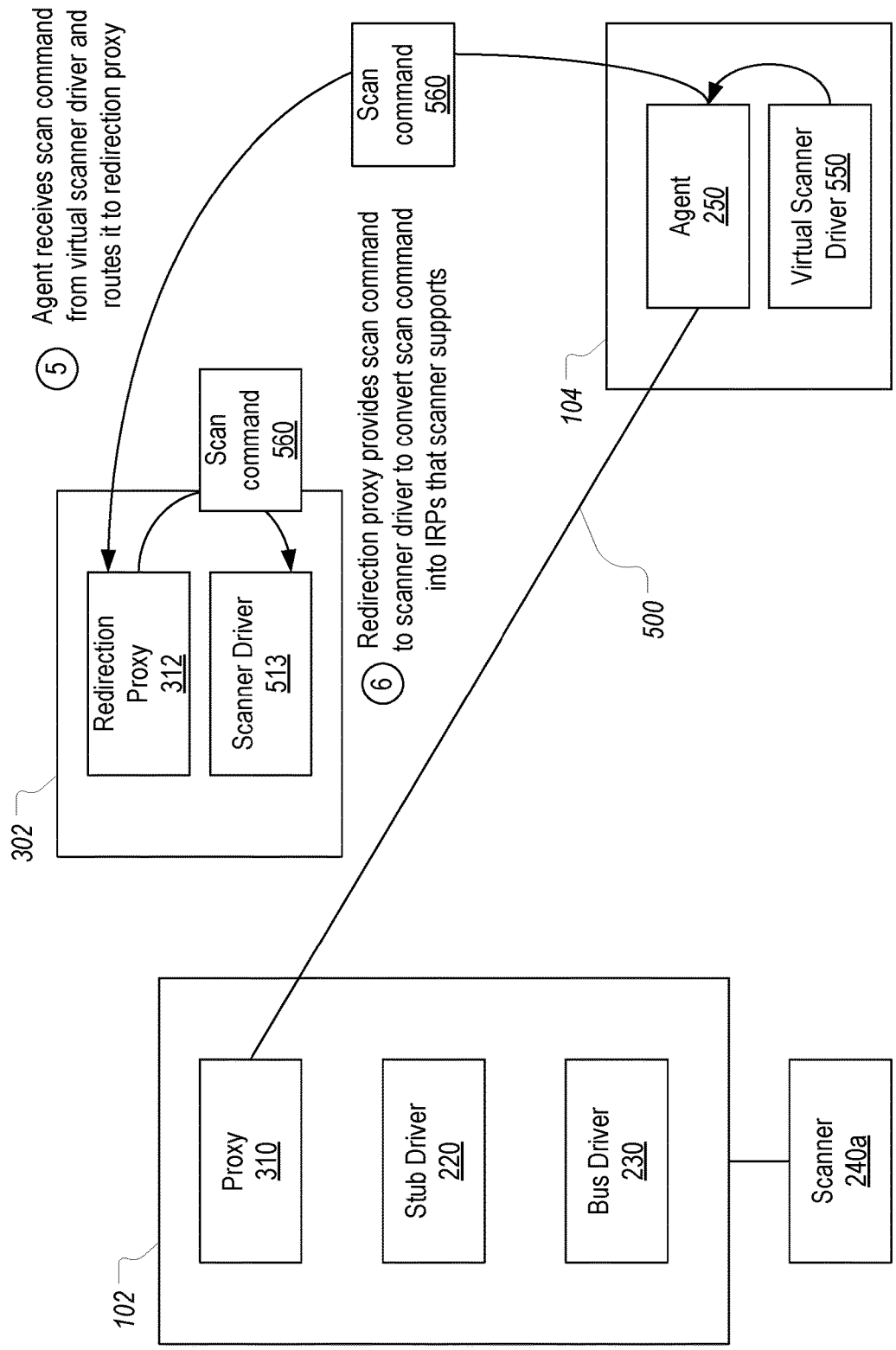

Next, in step 5 shown in FIG. 5C, virtual scanner driver 550 can route scan command 560 to agent 250 which will then send scan command 560 to redirection proxy 312. This communication of scan command 560 can be performed using any suitable connection as mentioned above including a TCP, UDP, or remote display protocol connection. In step 6, redirection proxy 312 can provide scan command 560 to scanner driver 513. Scanner driver 513 can be the vendor-provided driver for scanner 240a and will therefore convert scan command 560 into a format suitable for transfer to scanner 240a.

Figure 5D:
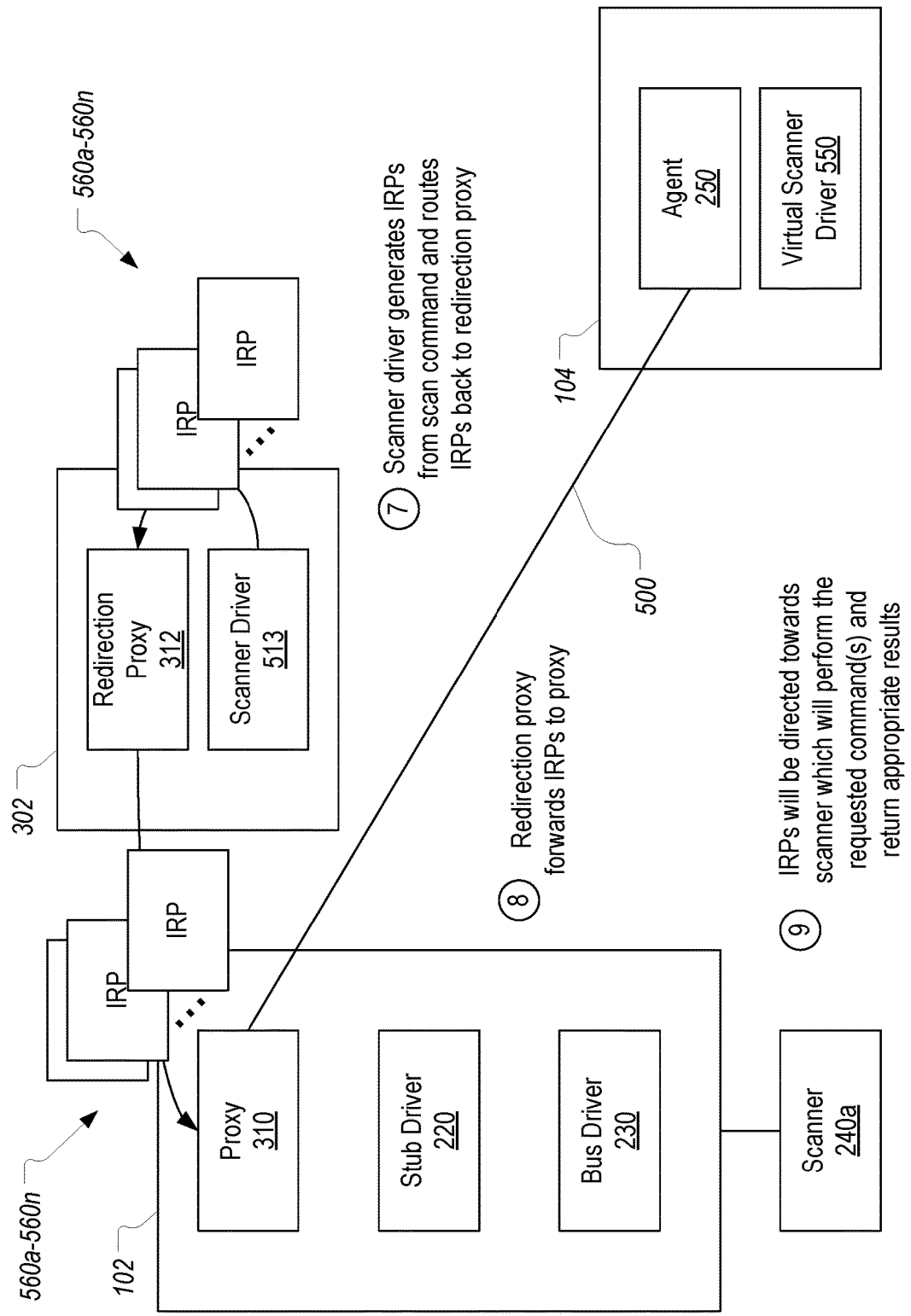
Figure 5E:
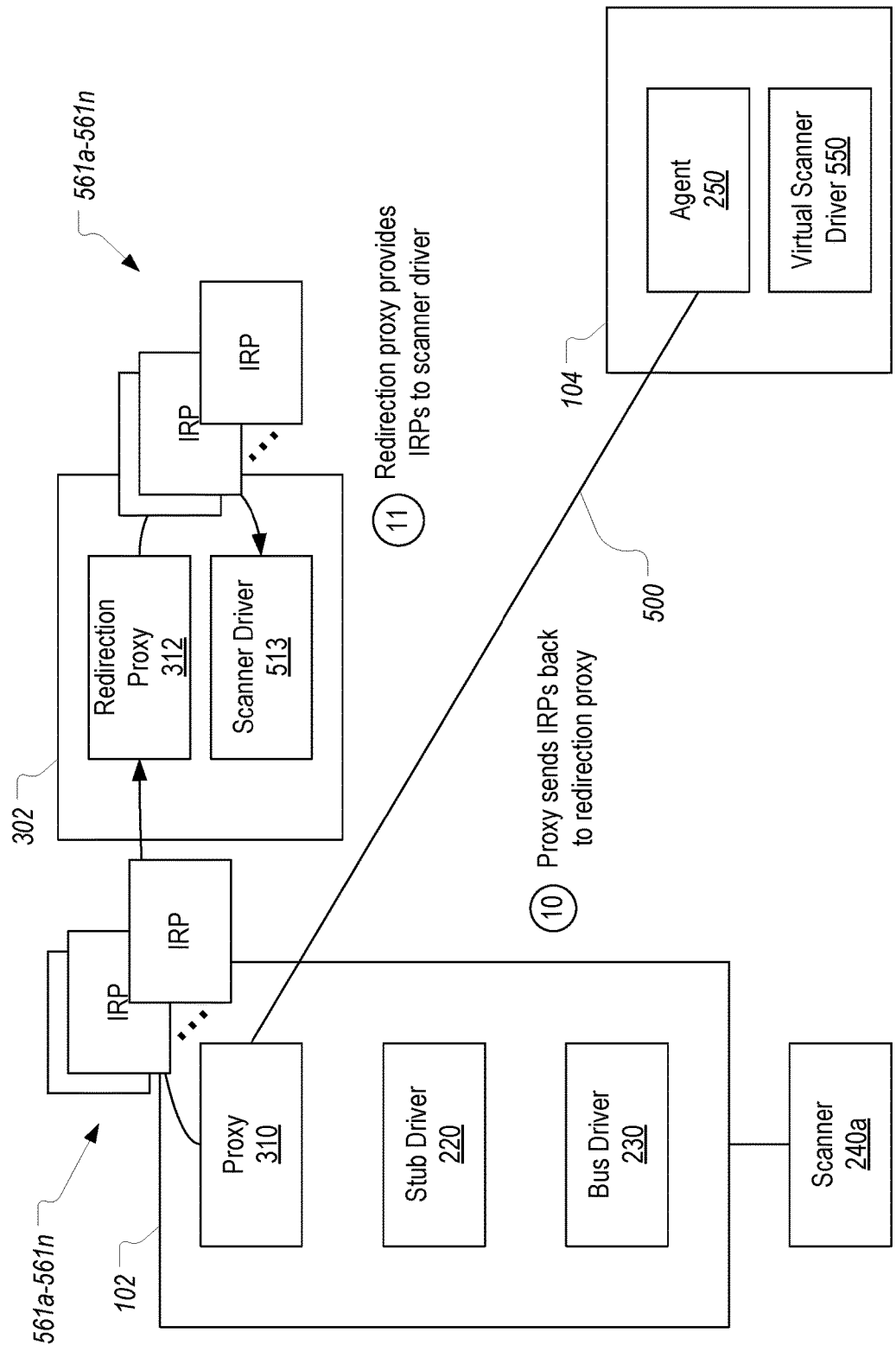

In step 7 shown in FIG. 5D, scanner driver 513 is shown as generating a number of IRPs 560a-560n which represent scan command 560. IRPs 560a-560n will then be routed back to redirection proxy 312 (which may occur via a virtual bus driver similar to virtual bus driver 260 or via a properly positioned filter driver) to thereby allow redirection proxy 312 to send IRPs 560a-560n (or more correctly, to send information representing IRPs 560a-560n) to proxy 310 in step 8. Proxy 310 will then pass IRPs 560a-560n (or more correctly, equivalent IRPs that were generated on client terminal 102 from the content of IRPs 560a-560n that proxy 310 received) down the client-side stack to scanner 240a for handling. Scanner 240a will perform the command(s) represented in IRPs 560a-560n and generate appropriate results in step 9. Assuming scan command 560 represented a request to scan an image, the results will constitute image data that will be passed back up the client-side stack in the appropriate format (e.g., IRPs containing URBs).

In step 10, proxy 310 will receive the results (represented as IRPs 561a-561n) and will forward them onto redirection proxy 312 in step 10. Redirection proxy 312 will then provide IRPs 561a-561n (which can represent IRPs 560a-560n after being updated with the content received from proxy 310) to scanner driver 513 in step 11 to thereby allow scanner driver 513 to process the IRPs in a typical manner (given that scanner driver 513 is the vendor-provided driver). In this example, it will be assumed that this typical processing involves converting the content of the IRPs into one or more appropriate TWAIN commands.

Figure 5F:
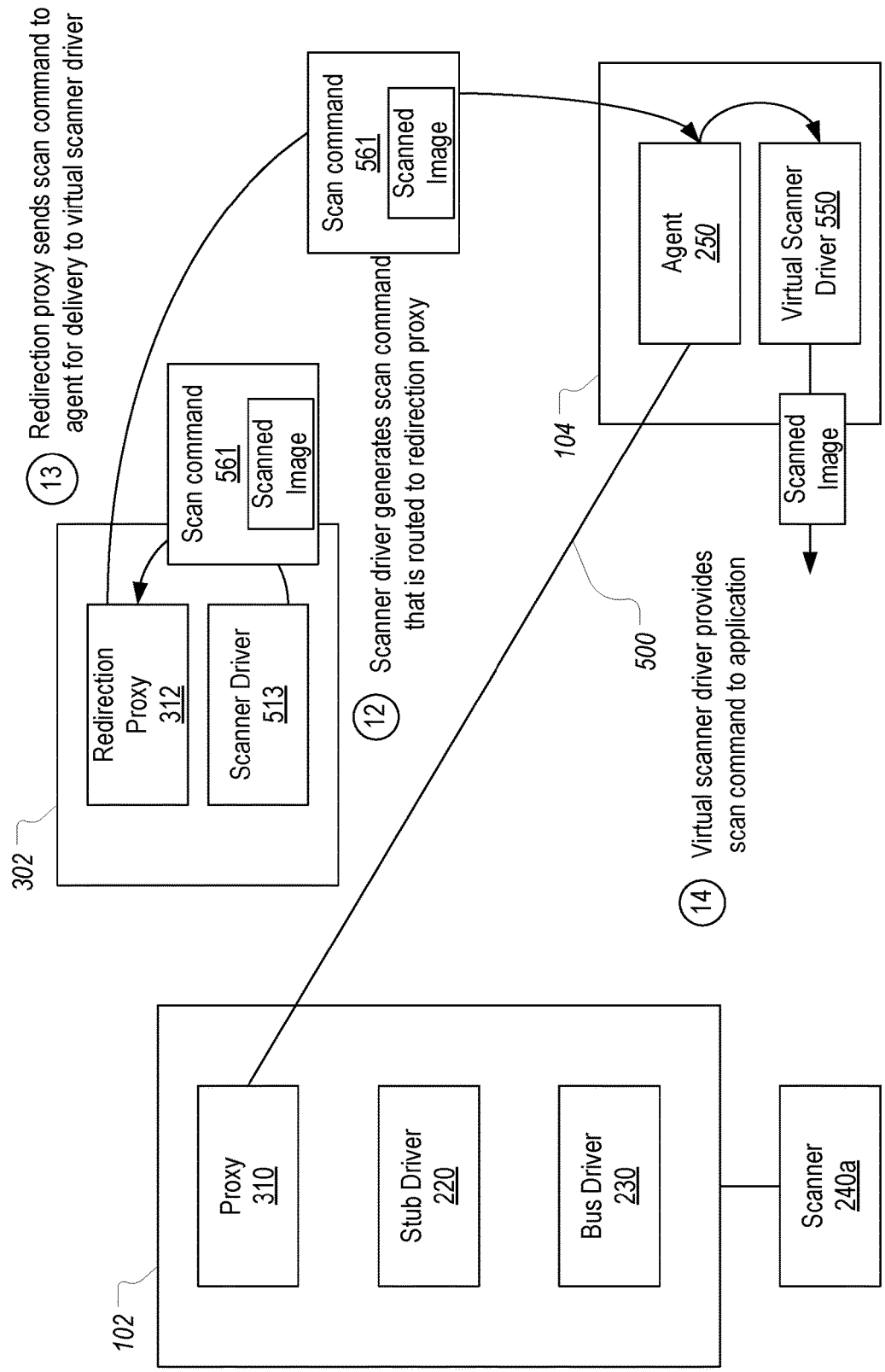

Accordingly, in step 12 as shown in FIG. 5F, scanner driver 513 is shown as providing scan command 561, which includes the scanned image, to redirection proxy 312 (which, as indicated above, may occur by means of a properly situated driver in the device stack). Then, in step 13, redirection proxy 312 will route scan command 561 to virtual scanner driver 550 via agent 250. Finally, in step 14, the scanned image can be provided to the application that requested the scan.

The above-described process results in many fewer communications that are sent over the WAN. In particular, because scan commands 560 and 561 are driver mapping commands, they will not involve sending a large number of IRPs in a request and response fashion over the WAN. This will reduce the total latency and bandwidth when performing a particular command. For example, in some cases, a single driver mapping command may translate into hundreds of IRPs at the lower layers of the device stack. By employing proxy device 302, the transfer of these IRPs over the WAN can be avoided. In essence, by employing virtual scanner driver 550 on server 104 and redirection proxy 312 on proxy device 302, the lower layer(s) of the scanner device stack which produce the large number of IRPs can be positioned on proxy device 302 which is on the same LAN as client terminal 102. Importantly, this is accomplished in a way that is transparent to the server-side applications.

Also, by employing proxy device 302, there will be no need to install the device driver (e.g., scanner driver 513) on server 104. In contrast, all that is required on server 104 is the virtual driver that implements the TWAIN, WIA, ISIS, or other suitable interface to allow the corresponding commands to be routed to/from proxy device 302. Similarly, because the device driver is located on proxy device 302, client terminal 102 will not require the device driver. This enables client terminal 102 to be a thin client and facilitates running non-Windows operating systems (i.e., operating systems that oftentimes do not support the Windows-based device drivers) on client terminal 102.

Because scan command 561 may typically be a single command that includes the actual scanned image data, WAN optimization techniques can be applied to further minimize the bandwidth required to perform a scan from a redirected device. For example, scan command 561 may include a relatively large amount of data to which JPEG compression logic can be applied to reduce the overall size of the transfer over the WAN.

A very similar process can be performed for other types of devices that provide image data from client terminal to server 104. For example, in the case of a webcam, even though the webcam may generate a large number of IRPs to provide webcam data for a particular duration of time, the IRPs can be processed into a webcam command similar to scan command 561 on proxy device 302 and then this webcam command can be sent over the WAN.

Figure 6A:
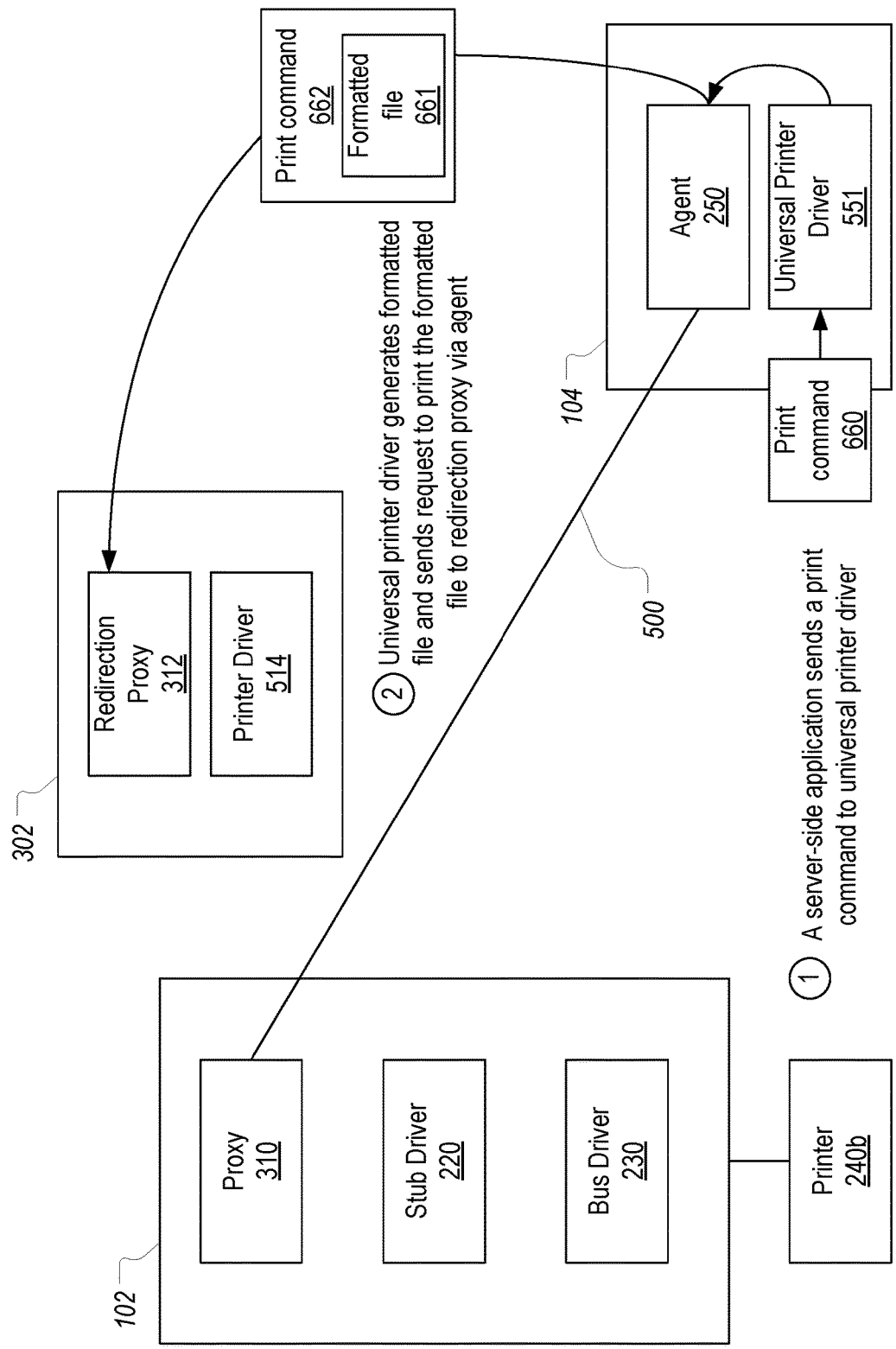
FIGS. 6A-6C illustrate how a printer can be virtualized on the server.
Figure 6B:
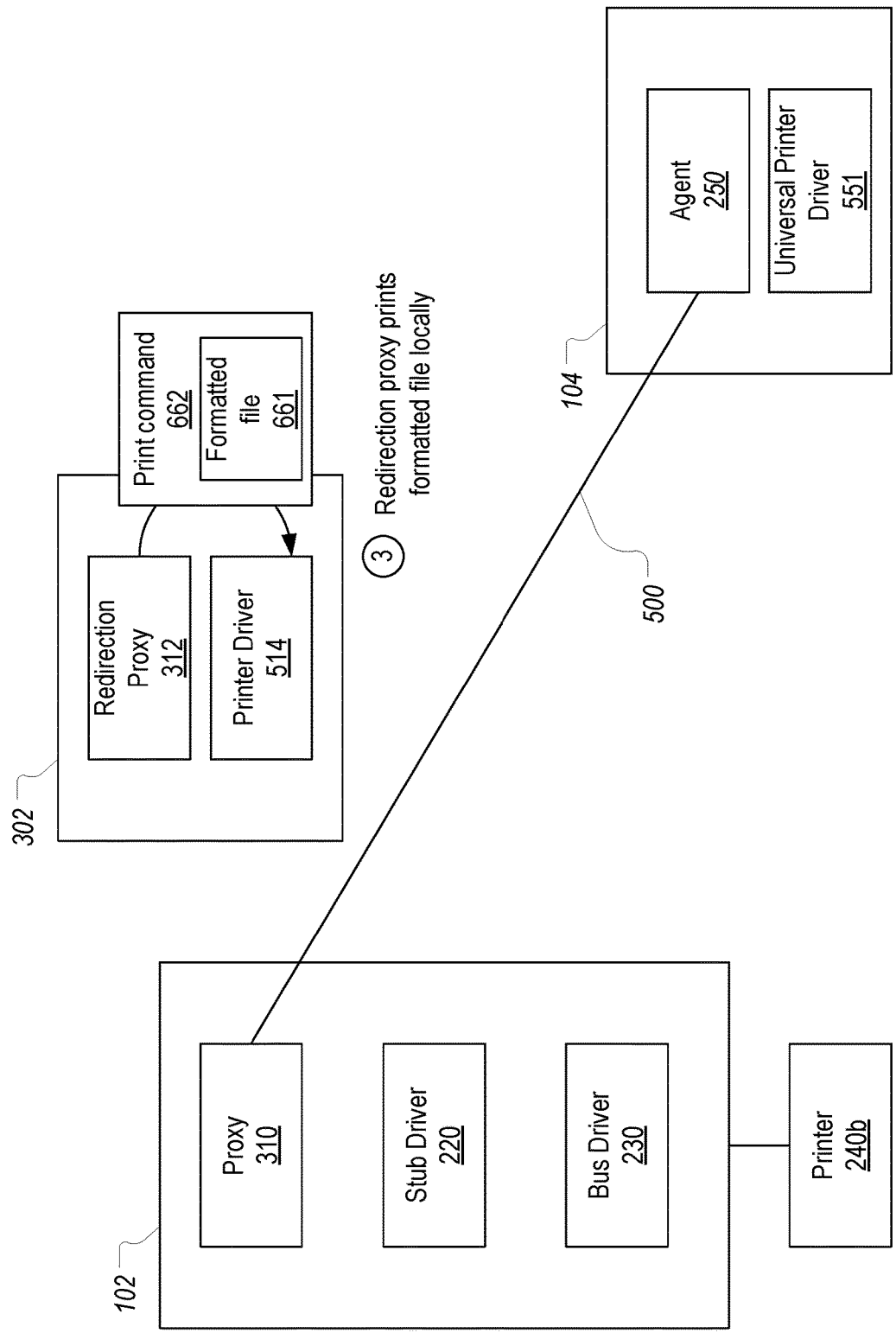
Figure 6C:
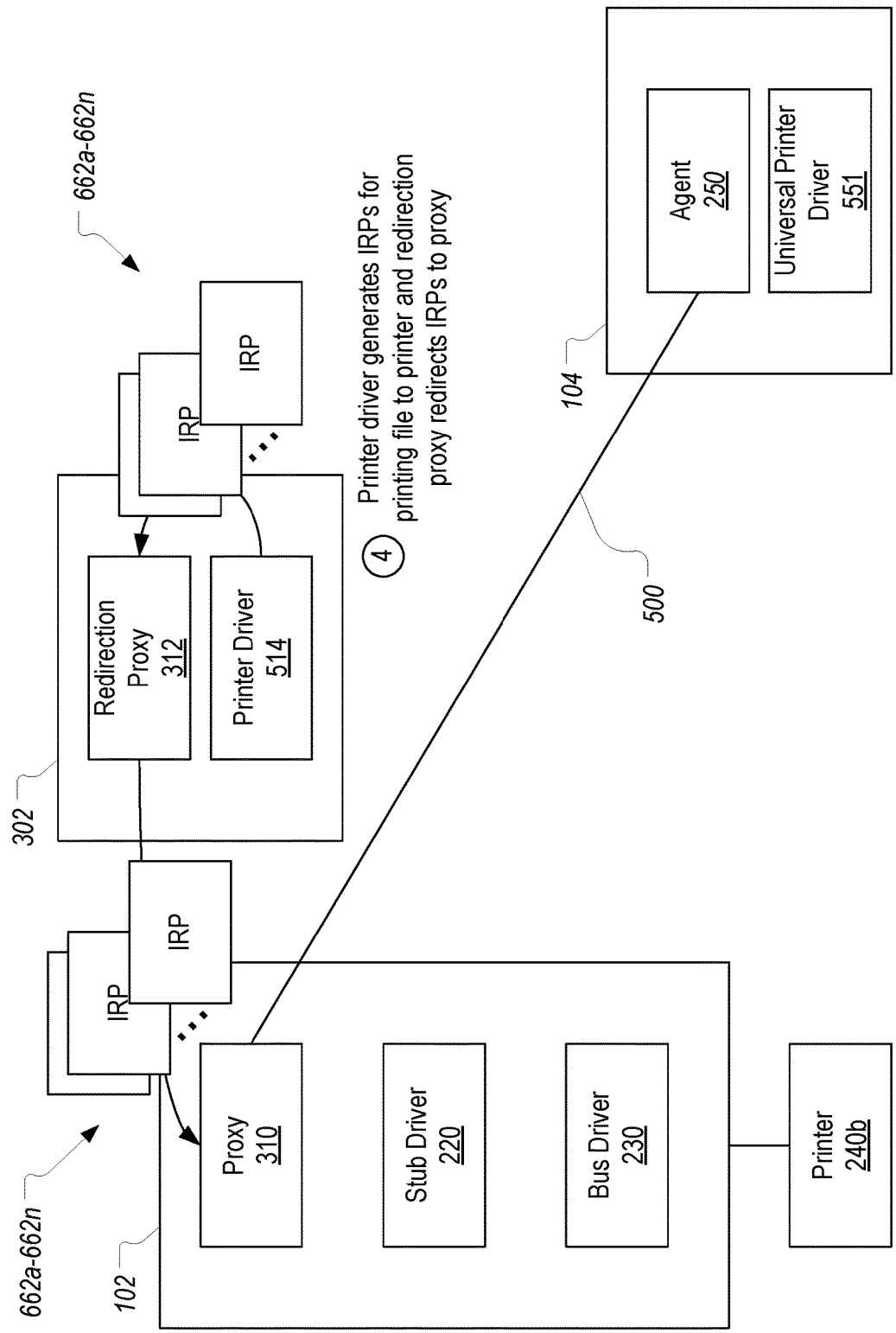

In the case of a printer, a slightly different process can be performed. Unlike scanners which involve sending image data to the server, a printer involves sending a print file to the client terminal. FIG. 6A-6C illustrate this printing process.

In FIG. 6A, it will be assumed that remote display protocol connection 500 has already been established and that printer 240b has been connected to client terminal 102. It will also be assumed that proper notifications of the connection of printer 240b have already been sent (similar to what is shown in FIG. 5A) resulting in a printer driver 514 being loaded on proxy device 302 and a universal printer driver 551 being loaded on server 104 (or within the appropriate virtual machine on server 104). Also, appropriate steps can be taken by agent 250 to cause printer 240b to appear on server 104.

Printer driver 514 can be the vendor-provided printer driver for printer 240b and will therefore be configured to generate appropriate communications (e.g., IRPs) for sending print jobs to printer 240b. In contrast, universal printer driver 551 can be configured to generate files in a standard format. For example, universal printer driver 551 can function as a "Print to PDF" or "Print to XPS" printer even though it is represented as a physical printer 240b on server 104. Accordingly, when a server-side application provides a print request to universal printer driver 551, a "formatted file" will be generated on server 104.

In step 1 shown in FIG. 6A, a server-side application sends a print job to printer 240b which in reality is sent to universal printer driver 551. In step 2, universal printer driver 551 generates a formatted file 661 (e.g., a file in XPS or PDF format) and routes a print command 662 containing formatted file 661 to agent 250 for delivery to redirection proxy 312. Alternatively, universal printer driver 551 can provide formatted file 6p1 to agent 250 which will then generate print command 662 containing formatted file 661. Print command 662 is an example of a driver mapping command and may be in the form of a universal printer driver command.

In step 3 shown in FIG. 6B, upon receiving print command 662, redirection proxy 312 can print formatted file 661 locally. In particular, redirection proxy 312 can issue print command 662 containing formatted file 661 to printer driver 514. Printer driver 514 will handle print command 662 in a typical fashion. For example, printer driver 514 will generate appropriate IRPs 662a-662n for communicating the print command to printer 240b. Because printer 240b is being redirected to proxy device 302, in step 4 shown in FIG. 6C, IRPs 662a-662n will be routed to redirection proxy 312 (e.g., via a virtual bus driver or other appropriately positioned filter driver) which will forward them (or their contents) to proxy 310 which will in turn submit IRPs 662a-662n down the client-side stack for delivery to printer 240b. As a result, formatted file 661 will be printed by printer 240b. Although not shown, the IRPs representing the completion of the print job (or any failure) will be routed back to redirection proxy 312 for handling by printer driver 514. Any response generated by printer driver 514 will then be intercepted by redirection proxy 312 and routed back to agent 250 for delivery to universal printer driver 551. Universal printer driver 551 can then return an appropriate response to the application that initiated the process.

Accordingly, by employing universal printer driver 551 on server 104 and redirection proxy 312 on proxy device 302, a simple driver mapping command containing the file to be printed, rather than numerous IRPs, will be transmitted over the WAN thereby greatly reducing the bandwidth and latency of printing to a redirected device in a WAN environment.

In summary, the present invention can employ a proxy device as an intermediary when a device is redirected in a WAN environment. The proxy device allows the device to be redirected over the LAN to the proxy device and then implements driver mapping techniques to virtualize the redirected device on the server. Because far fewer driver mapping communications are required than USB-based IRPs, the performance of a redirection device is optimized in the WAN environment.

Figure 7:
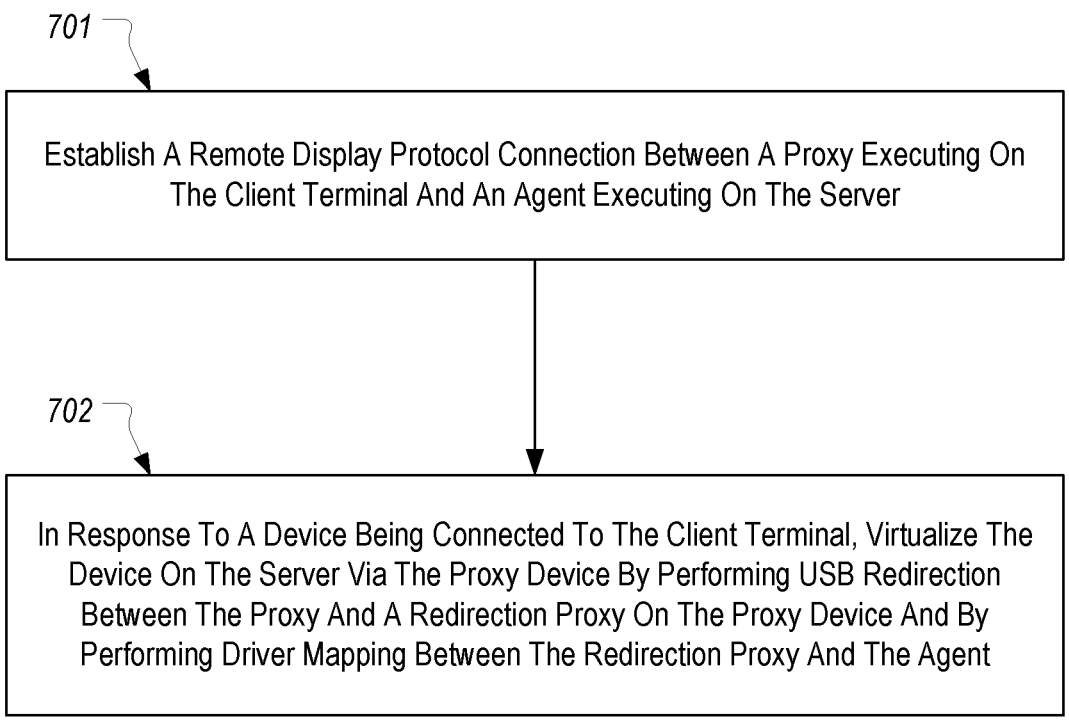
FIG. 7 provides a flowchart of an example method for virtualizing a device on a server.

FIG. 7 provides a flowchart of an example method 700 for virtualizing a device on a server. Method 700 can be performed in a VDI environment that includes a client terminal, a proxy device, and a server.

Method 700 includes an act 701 of establishing a remote display protocol connection between a proxy executing on the client terminal and an agent executing on the server. For example, proxy 310 and agent 250 can establish connection 500.

Method 700 includes an act 702 of, in response to a device being connected to the client terminal, virtualizing the device on the server via the proxy device by performing USB redirection between the proxy and a redirection proxy on the proxy device and by performing driver mapping between the redirection proxy and the agent. For example, in response to scanner 240a or printer 240b being connected to client terminal 102, the scanner or printer can be virtualized on server 104 by performing USB redirection to redirect the scanner or printer to redirection proxy 312 and by performing driver mapping between redirection proxy 312 and agent 250.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for virtualizing a USB device in a WAN environment that includes a client terminal, a server, and a proxy device, the method comprising:

providing a proxy on the client terminal, the client terminal being connected to a LAN;
providing an agent on the server;
providing a redirection proxy on the proxy device, the proxy device also being connected to the LAN;
establishing a remote display protocol connection between the proxy on the client terminal and the agent on the server, the remote display protocol connection being established over a WAN;
while a USB device is connected to the client terminal, maintaining, by the proxy on the client terminal, a redirection connection with the redirection proxy on the proxy device, the redirection connection being maintained over the LAN;
in conjunction with maintaining the redirection connection, maintaining, by the redirection proxy on the proxy device, a driver mapping connection with the agent on the server, the driver mapping connection being maintained over the WAN; and
virtualizing the USB device on the server by:
employing the redirection connection to perform USB redirection between the proxy on the client terminal and the redirection proxy on the proxy device; and
employing the driver mapping connection to perform driver mapping between the redirection proxy on the proxy device and the agent on the server.

2. The method of claim 1, wherein the proxy establishes the redirection connection in response to the USB device being connected to the client terminal.

3. The method of claim 1, wherein the USB device is a scanner or a printer.

4. The method of claim 1, wherein performing USB redirection comprises transferring content of IRPs over the redirection connection.

5. The method of claim 1, wherein the USB device is a scanner and performing driver mapping comprises sending TWAIN, WIA, or ISIS commands over the driver mapping connection.

6. The method of claim 5, wherein the redirection proxy receives content of IRPs representing a scanned image over the redirection connection and provides the content of the IRPs to a scanner driver on the proxy device.

7. The method of claim 6, wherein, in response to providing the content of the IRPs to the scanner driver, the redirection proxy receives one or more TWAIN, WIA, or ISIS commands that the scanner driver generated from the content of the IRPs.

8. The method of claim 7, wherein the redirection proxy routes the one or more TWAIN, WIA, or ISIS commands to the agent over the driver mapping connection.

9. The method of claim 1, wherein the USB device is a printer and performing driver mapping comprises the agent sending a formatted file to the redirection proxy over the driver mapping connection.

10. The method of claim 9, wherein the formatted file is provided to a printer driver on the proxy device which generates IRPs for submitting a request to print the formatted file to the printer.

11. The method of claim 10, wherein the redirection proxy routes content of the IRPs to the proxy over the redirection connection.

12. The method of claim 1, wherein the redirection connection is a socket connection.

13. One or more computer storage media storing computer-executable instructions which implement the following components when executed by one or more processors:
a proxy that is configured to execute on a client terminal that is connected to a LAN;
an agent that is configured to execute on a server that is connected to the client terminal via a WAN; and
a redirection proxy that is configured to execute on a proxy device that is also connected to the LAN;
wherein:
the proxy and the agent are configured to establish a remote display protocol connection over the WAN;
the proxy and the redirection proxy are configured to establish a redirection connection over the LAN;
the redirection proxy and the agent are configured to establish a driver mapping connection over the WAN; and
when a USB device is connected to the client terminal, the proxy, the redirection proxy and the agent are configured to virtualize the USB device on the server by;
employing the redirection connection to perform USB redirection between the proxy and the redirection proxy; and
employing the driver mapping connection to perform driver mapping between the redirection proxy and the agent.

14. The computer storage media of claim 13, wherein the redirection proxy is configured to interface with a device driver on the proxy device to convert IRPs to driver mapping commands and to convert driver mapping commands to IRPs.

15. The computer storage media of claim 14, wherein the agent is configured to interface with a driver on the server to handle the driver mapping commands.

16. A method for redirecting a USB device comprising:
providing a proxy on a client terminal, the client terminal being connected to a LAN;
providing an agent on a server;
providing a redirection proxy on a proxy device, the proxy device also being connected to the LAN;
establishing a remote display protocol connection between the proxy on the client terminal and the agent on the server, the remote display protocol connection being established over a WAN;
while a USB device is connected to the client terminal, maintaining, by the proxy on the client terminal, a redirection connection with the redirection proxy on the proxy device, the redirection connection being maintained over the LAN;
in conjunction with maintaining the redirection connection, maintaining, by the redirection proxy on the proxy device, a driver mapping connection with the agent on the server, the driver mapping connection being maintained over the WAN;
receiving, at the proxy on the client terminal, one or more IRPs pertaining to the USB device that is connected to the client terminal; routing by the proxy, content of the IRPs over the redirection connection to the redirection proxy on the proxy device;
passing, by the redirection proxy, the content of the IRPs to a device driver on the proxy device;
receiving by the redirection proxy, driver mapping command that was generated by the device driver from the content of the IRPs; and
routing, by the redirection proxy, the driver mapping command over the driver mapping connection to the agent on the server.

17. The method of claim 16, further comprising:
  passing, by the agent, the driver mapping command to a driver executing on the server.

18. The method of claim 16, wherein the USB device is a scanner and the driver mapping command comprises a TWAIN, WIA, or ISIS command that includes image data.

19. The method of claim 16, further comprising:
  receiving, at the redirection proxy, a print command that includes a formatted file;
  submitting the print command to a printer driver on the proxy device; and
  redirecting IRPs that are directed to the USB device and that represent the print command to the proxy over the redirection connection.

20. The method of claim 16, wherein the proxy establishes the redirection connection in response to the USB device being connected to the client terminal, and the redirection proxy establishes the driver mapping connection in response to a notification received over the redirection connection, the notification including information about the USB device.

* * * * *